United States Patent [19]
Vogt et al.

[11] Patent Number: 5,689,445
[45] Date of Patent: Nov. 18, 1997

[54] ELECTRONIC COMPASS AND ATTITUDE SENSING SYSTEM

[75] Inventors: Mark A. Vogt, Santee; Blair H. Brumley, La Jolla; Kent L. Deines, Poway, all of Calif.

[73] Assignee: Rowe-Deines Instruments Incorporated, San Diego, Calif.

[21] Appl. No.: 628,843

[22] Filed: Apr. 5, 1996

[51] Int. Cl.$^6$ .................................................. G01C 17/38
[52] U.S. Cl. .......................................... 364/559; 364/443
[58] Field of Search ................................. 364/443, 457, 364/559; 73/1 E

[56] References Cited

U.S. PATENT DOCUMENTS

| | | |
|---|---|---|
| 3,942,258 | 3/1976 | Stucki et al. . |
| 4,546,551 | 10/1985 | Franks et al. . |
| 4,677,381 | 6/1987 | Geerlings . |
| 4,953,305 | 9/1990 | Van Lente et al. . |
| 5,095,631 | 3/1992 | Gavril et al. . |
| 5,161,311 | 11/1992 | Esmer et al. ............................. 324/245 |
| 5,287,295 | 2/1994 | Ives et al. . |

Primary Examiner—James P. Trammell
Assistant Examiner—Craig Steven Miller
Attorney, Agent, or Firm—Knobbe, Martens, Olson & Bear LLP

[57] ABSTRACT

An electronic heading and attitude sensing subsystem which is fully integrated with the existing hardware of an acoustic Doppler current profiler (ADCP) oceanographic sonar suite to reduce the size and complexity of the apparatus. The subsystem uses a tri-state drive signal with relaxation periods and integration windows to synchronously drive the fluxgate magnetic sensors while reducing the effects of non-linearities and higher order harmonics which may result in heading errors. The present invention includes an electrolytic tilt sensor device and driving circuit which allow measurement of system vertical orientation without the effects of electrolyte conductivity are described. The present invention further includes methods of system calibration, magnetic perturbation modeling, and heading calculation.

6 Claims, 11 Drawing Sheets

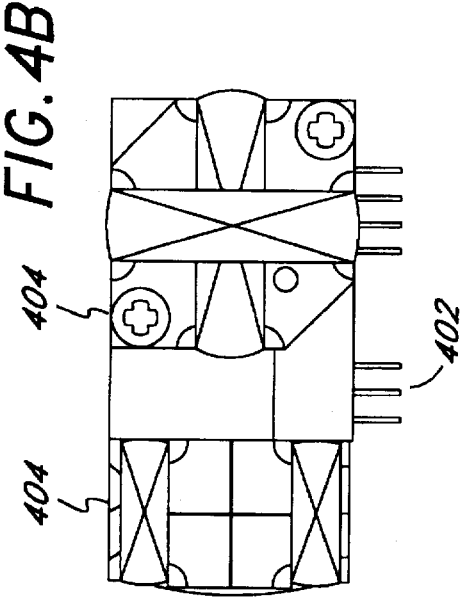
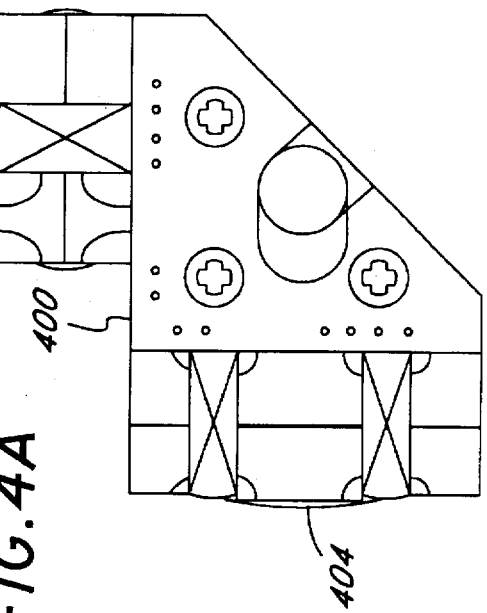
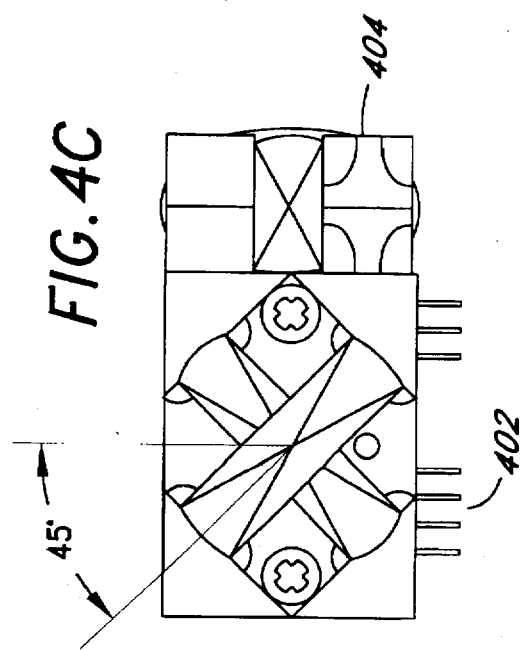

ELECTRONIC COMPASS AND ATTITUDE SENSING SYSTEM

BACKGROUND OF THE INVENTION

1. Field of the Invention

The present invention relates to an electronic compass and attitude sensor and, more specifically, an electronic sensing subsystem is integrated with a sonar system and comprises fluxgate magnetic sensors and tilt detectors.

2. Description of the Related Art

An acoustic Doppler current profiler (ADCP) system is a type of sonar system used to remotely measure water velocity over varying ranges. Such a system measures the velocity of water by calculating the Doppler shift associated with received echoes from an acoustic signal produced by transducers and radiated into the water in vertical columns or beams. Particles, inhomogeneities, and other phenomena present in the water of a given vertical column result in reflection of the radiated acoustic signal back toward the transducer. The frequency of the backscattered acoustic signal is shifted in frequency according to the well known Doppler relationship.

Ultimately, the velocity of a given volume of water under measurement is desired referenced to the earth coordinate system. Since the measuring platform may move in relation to this coordinate system (i.e, roll, pitch, yaw and relative velocity) measurements made by the platform in its own coordinate system must be transformed to the earth coordinate system. Earth coordinates may be determined from a vessel by measuring the earth's magnetic field. However, complications arise due to irregularities in the shape of the earth and variations in the magnetic field intensity and direction at any given location. Additionally, magnetic north does not coincide with geographic (polar) north, and the localized magnetic field vector may vary as a function of the time of the year.

A magnetic compass and attitude sensor which accounts for these factors is required to provide precise heading and attitude information for use in the conversion of ADCP beam coordinate velocities to earth coordinate velocities. Previous generation ADCPs incorporated compass hardware separate from the Doppler sonar hardware, thereby requiring additional physical space and complexity in the form of additional microprocessors, convertors, power supplies, and so forth.

Magnetic compass assemblies are generally classified as one of two types: mechanical or electronic. Mechanical compasses typically utilize a floating card assembly mechanically suspended in a viscous medium. These units are generally not employed in ADCP systems due to their relative imprecision. Electronic compasses typically utilize a number of flux sensors, the operation of which are well known in the technology. Designs for flux sensors include, for example, U.S. Pat. No. 3,942,258, which describes a thin-film device. Perhaps, the most common sensor design is the fluxgate, which provides the benefits of accuracy and relative simplicity and small size.

Fluxgate Sensors

Fluxgate sensors usually are constructed with a toroidal ferromagnetic core surrounded by excitation and sensing coil elements. The fluxgate excitation coil is driven by high frequency alternating signals generated by an electronic signal generator such as a transistorized oscillator. The magnetic coupling between the coil and the localized earth magnetic field is used to determine the relationship between the coil orientation and the earth's magnetic field vector. As the voltage induced by the driving signal imposed across the excitation coil varies, the current and magnetic field generated by the winding vary as well, thereby altering the linkage of the earth's magnetic flux and inducing a voltage in the secondary or sensing coil elements. The amplitude and polarity of the induced voltage signal is indicative of the orientation of the sensor coil to the earth's magnetic field vector. The output of the sensor coils can then be integrated to produce an output signal indicative of platform orientation, or heading, in relation to the earth coordinate system. The earth's magnetic field vector has a component normal to the earth's surface (i.e., vertical) which must be accounted for as well during the heading calculation.

Flux sensors typically utilize only three sensing coils in that this is all that is required to determine the earth's magnetic field. However, such units may be susceptible to failure of one of the sensing coils, and may not completely detect non-uniformities in the earth's magnetic field that induce errors.

Various schemes have been devised for exciting the fluxgate driving coil and processing the signal output from the sensing coils. A common arrangement is to drive the excitation coil with a sinusoidal signal to induce voltages in the sensing coils, the output of which is input to a synchronous phase detector. The output of the phase detector is then integrated to provide a demodulated DC output with amplitude and polarity related to heading. Alteratively, in non-synchronous detection devices, the second harmonic of the sensing coil output is isolated via digital or analog filtering.

U.S. Pat. No. 4,677,381 discloses a flux gate sensor drive system using the synchronous detection approach which employs an excitation signal to drive the sensor core to saturation at regular intervals (i.e., coincident with the drive waveform or pulses). The resulting second harmonic induced in the sensing coils is temporally aligned with respect to the reference drive signals.

U.S. Pat. No. 4,953,305 discloses a similar circuit with synchronous detection. A series of transistors are used to permit alternating current flow through the excitation coil. Clocking signals are applied to a pulse-clocked synchronous phase detector such that the clocking signals are shifted in phase, typically 45 degrees ahead and 45 degrees behind the excitation waveform, thereby providing an output signal "window" which is synchronized with the saturation of the sensor core. The synchronized output signals are passed to integrators, which receive alternating half-cycle sinusoidal signals from the synchronous phase detector, to provide a time-varying DC output related to the heading of each sensing coil. No analog or digital filtering is necessary to isolate the second harmonic signal due to the synchronization of the core saturation with the drive signal and sensing coil output.

However, the disclosed device uses an excitation waveform that drives the primary coil only on one-half cycle (i.e., a bi-state waveform with the two states being zero volts and some positive voltage) as opposed to using both halves of the cycle. Also, the system requires use of a synchronous detector with timing signals to develop the integration window. The system further relies on the occurrence of core saturation approximately coincident with the midpoint of each driving signal pulse. Thus, periods of low inductance and rapid magnetic desaturation of the sensor core will be reflected in higher order harmonics and non-linearities resulting from induced voltage transients in the sensing coils which are included in the coil output signal processing (phase detection and integration). These higher order harmonics and non-linearities may ultimately reduce the accuracy of the heading output.

U.S. Pat. No. 4,546,551 discloses an automotive compass utilizing a flux gate sensor with digital bandpass filtration to process the sensor output signal. This isolates the second harmonic signal generated in the sensing coils which is then processed to derive a signal functionally related to the direction of the platform. The primary drawbacks of filtration systems are the additional cost and complexity associated with the filter and supporting circuit components, as well as those cited above. Furthermore, the calibration of the system may be affected by changes in the platform on which it is mounted as well as the presence of large ferromagnetic objects.

Tilt/Orientation Sensor

In addition to a fluxgate sensor, an attitude, or tilt, sensor is necessary to provide information regarding the attitude of the platform relative to the earth coordinate system. Electrolytic tilt sensors are commonly employed and are well known in the technology. These sensors utilize a sealed chamber with a plurality of conducting electrodes protruding through the wall of the chamber and spatially arranged such that tilt of the sensor in any direction will be detected. The chamber is partially filled with an electrolyte solution and the electrodes are driven with a high frequency oscillating signal thereby generating an output functionally related to the attitude of the sensor in two dimensions (i.e., the x {roll} and y {pitch} axes of an orthogonal coordinate system). Since the electrolyte maintains a constant relationship with the earth's localized gravitational field vector, tilt output may be used to find the pitch and roll components directly. Although commonly used to determine vertical (i.e., up/down) orientation, prior art tilt sensors are typically configured with outer and center electrodes of common length and the outer tilt sensor electrodes being driven via the center electrode. This arrangement necessitates use of a separate circuit/sensing devices to determine orientation and tilt. Furthermore, changes in the conductivity of the electrolyte resulting from ambient temperature changes must be corrected for in traditional biasing schemes (i.e., driving the sensor via the center electrode and taking the output off each of the outer electrodes).

As previously noted, it is necessary to transform data obtained in the ADCP/compass coordinate system to that of the earth coordinate system. Such transformation is traditionally performed by first calculating the heading, roll, and pitch components from data derived from the fluxgate and tilt sensors and then creating a transformation matrix which is then applied to the ADCP-referenced data set to produce a resulting data set in the earth coordinate system. Due to the size of the matrices involved, this transformation requires substantial computational capacity reflected in additional processor and memory capacity.

Calibration

Ferromagnetic and magnetically permeable mounting fixtures, power supplies, and even the ADCP platform itself may induce errors in the output of the fluxgate sensor due to the interaction of their magnetic fields with that of the compass components. Furthermore, variations in the physical geometry of the windings of the fluxgate coils, impedance differences in IC and discrete circuit components, as well as placement and alignment of the fluxgate sensor assembly itself can all have an appreciable effect. Therefore, calibration of the unit is required to account for such influences. Since such effects may be time variant, periodic calibration is necessary.

Calibration of fluxgate sensors is traditionally performed by orienting the sensor in various directions and attitudes referenced to the earth's magnetic field and measuring the output of the sensing coils. Such calibration through absolute reference to the earth's magnetic field requires substantial effort and computation, as well as precise alignment of the fluxgate sensor elements during manufacturing.

Calibration of the tilt sensor is similar in that the sensor is moved to a number of discrete orientations about each axis and the output of the sensor measured. However, since the tilt sensor is oriented to the gravitational field, no reference to the earth's magnetic field is utilized.

U.S. Pat. No. 5,287,295 provides a methodology of calibrating a fluxgate sensor type compass to correct for any non-orthogonality of the sensing coil windings in relation the sensor core. Outputs of the sensing coils for a number of different compass headings are measured and stored and used to calculate a difference angle (i.e., that angle by which the sensing windings deviate from orthogonality). This difference angle data is subsequently used as the basis for a correction to the measured compass heading. It should be noted that reference to the earth's magnetic field is required for this calibration method.

U.S. Pat. No. 4,953,305 discloses a method of continuous calibration and sensing of the magnetic field as measured by a field sensor located within the compass platform. As the platform travels and is rotated throughout 360 degrees of azimuth, the device samples the output signal from the fluxgate sensors and analyzes this information to determine the minimum and maximum signal levels and calculates a compass correction which is applied to the measured data. As with other prior art methods, absolute sensing of or reference to the earth's magnetic field is also employed in this disclosure, thereby presenting a significant limitation.

Based on the foregoing related technology, it would be desirable to provide an improved electronic compass device with greater accuracy and reliability than prior art systems, and which was integrated with ADCP hardware so as to minimize the need for additional supporting components or complexity while at the same time minimizing the physical space required for the system. It would also be desirable to provide an improved tilt sensor and driving method whereby sensor vertical orientation and tilt information could be obtained directly from one sensor, and the effects of changes in electrolyte conductivity due to temperature were mitigated. It would also be desirable to provide an improved fluxgate sensing subsystem which was less prone to the effects of sensing coil failure and non-uniformities in the earth's magnetic field. It would further be desirable to provide an improved method of coordinate system transformation which is simpler and less computationally intensive, thereby requiring less time and processor capability. It would be a further improvement to provide an improved method of calibrating the fluxgate sensors which would not require absolute reference to the earth's magnetic field vector or fluxgate coil alignment during manufacturing.

SUMMARY OF THE INVENTION

An improved attitude sensing subsystem of an acoustic Doppler current profiler consisting of a multi-axis fluxgate and inclinometer, and method of calibration of same satisfies the aforementioned needs.

In one aspect of the invention an attitude sensing module is fully integrated into the ADCP system with the computation, control and sequencing functions for the compass residing in a microprocessor or similar device shared with the other ADCP subsystems. Calibration data, embedded processor instructions, temporary variables, and other system data is stored in memory devices used by other ADCP subsystems, and conversion of compass circuit output voltage (tilt and fluxgate) is performed by way of processing devices shared by the other ADCP subsystems. Compass hardware is placed on circuit boards or existing assemblies with other ADCP subsystem functions to reduce the required space and physical size.

In a second aspect of the invention a fluxgate sensor driving and detecting circuitry comprises a microprocessor and associated decode and timing logic providing first and second frequencies to the fluxgate driving coil which are harmonically related. The toroidal core coil is excited with a waveform where the current through the coil reverses and the current reversal is separated by a relaxation period of no excitation current, thereby permitting exclusion of unwanted harmonics and non-linearities. A sense coil output integration circuit is also provided to minimize the variations of core saturation.

In another aspect of the invention a fluxgate comprises a fourth sensing coil used to provide redundant measurement for the purpose of detecting field gradients and/or failures of the compass hardware.

A further aspect of the invention relates to a tilt sensor and method of excitation, where the center electrode of the sensor is modified to allow use as an orientation sensor, and the remaining two-axis electrodes are driven so as to eliminate the effects of electrolyte conductivity changes with temperature.

Another aspect of the invention relates to a method for performing transformation between the ADCP and earth coordinate systems comprising the steps of generating a unit gravitational vector from the tilt sensor output, utilizing the gravitational vector and the estimated magnetic vector to generate East and North unit vectors, and then utilizing the orthogonality of the North, East, and gravitational vectors to form a transformation matrix for the ADCP-referenced current data. The transformation method reduces the time and computational capability required to perform the coordinate transformation.

Yet another aspect of the invention relates to a subsystem field calibration method and algorithm. The unit is rotated 360° once in a given plane, then tilted and rotated another 360° in the same plane while tilted. Fixture or absolute heading reference is not required. The algorithm examines the fluctuations of the earth's magnetic field in coordinates to determine updated calibration parameters that would null single and double cycle errors induced by hard and soft iron rotating with the compass, respectively.

A still further aspect of the invention is a method for calibrating the fluxgate sensor subsystem including a method of modeling hard and soft iron perturbations (which rotate with the ADCP) wherein the soft iron is treated as a 3×3 tensor. Eight orthogonal calibration positions are used in a first embodiment, and six in a second. In both embodiments, the chosen positions are not required to be aligned with respect to the earth's local magnetic field.

BRIEF DESCRIPTION OF THE DRAWINGS

FIGS. 4a–c detailed drawings of a preferred embodiment of an improved fluxgate sensor subassembly.

FIG. 8b is the fluxgate core hysteresis plot corresponding to FIG. 8a.

DETAILED DESCRIPTION OF THE PREFERRED EMBODIMENTS

Figure 1:
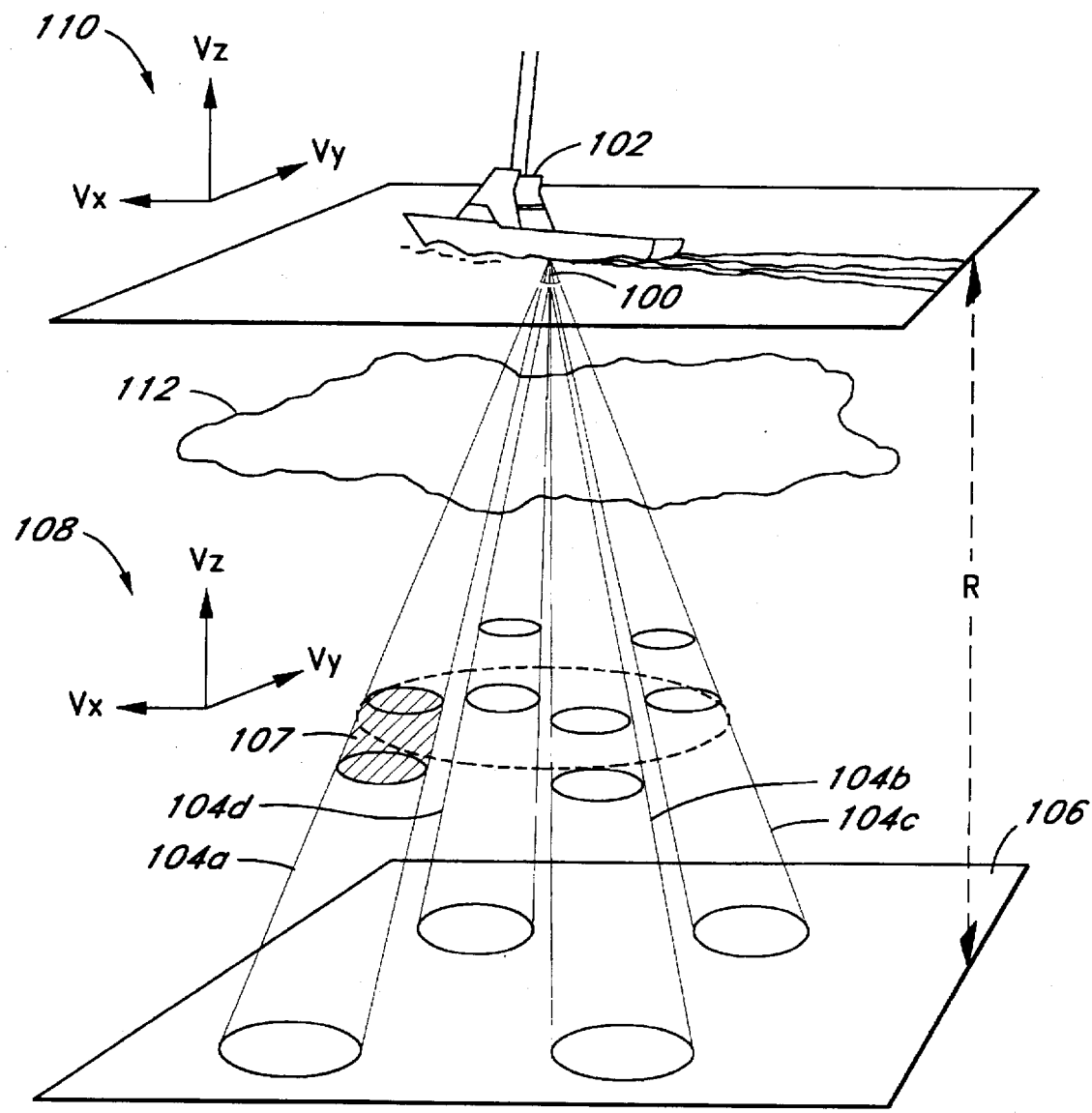
FIG. 1 is a perspective view of a downward looking current profiler having a multiplicity of transducers, wherein the transducers are attached to the hull of a vessel.

FIG. 1 shows an acoustic Doppler current profiler 100 attached to the hull of a moving oceangoing vessel 102. The current profiler 100 generates a set of acoustic beams 104 a,b,c,d, which emanate from transducers mounted on the vessel. The acoustic beams 104 are directed downward in a generally vertical orientation. Each beam illuminates a water column which can be decomposed into horizontal slices or cells 107. By appropriate transmission and reception of sound pulses, the rate of change of a pulse can be calculated. The rate of change of the pulse is used to determine a velocity along the beam which can then be decomposed into orthogonal velocity components such as those shown at 108.

Figure 2:
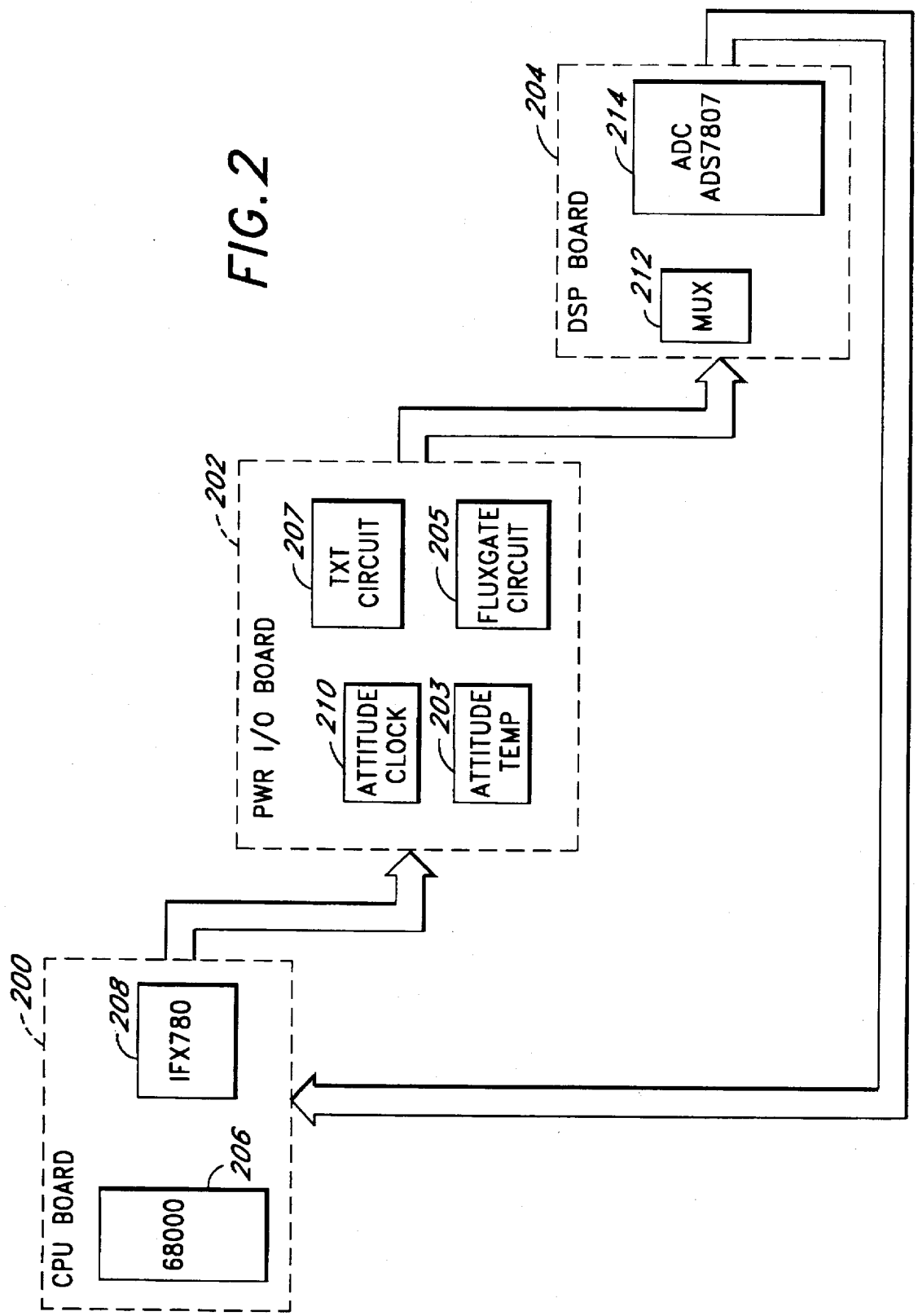
FIG. 2 is a block diagram of a preferred embodiment of an electronic attitude sensing subsystem showing its location within the ADCP system.
Figure 3A:
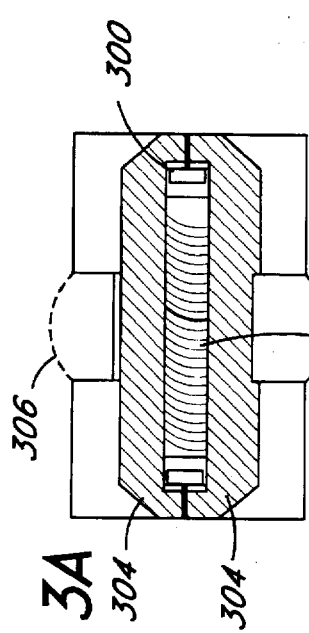
FIGS. 3a–d are detailed drawings of a preferred embodiment of an individual fluxgate sensor element for measuring ADCP platform heading.
Figure 3B:
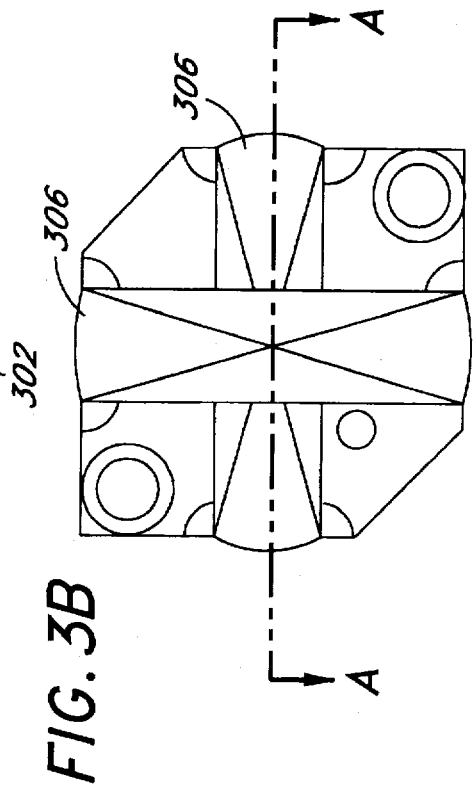
Figure 3D:
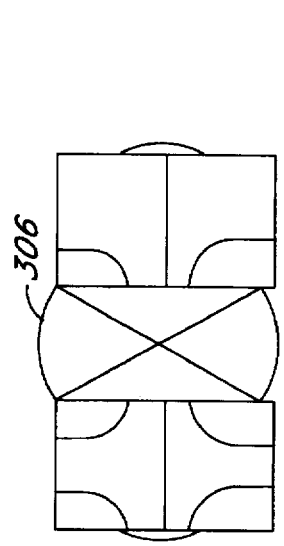
Figure 3C:
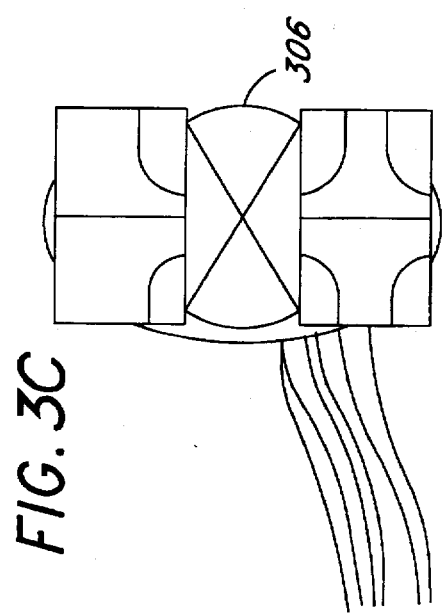

FIG. 2 shows a block diagram of the attitude sensing magnetic compass subsystem consisting of a three axis fluxgate compass and two axis inclinometer. Although the presently preferred embodiment integrates the subsystem in a current profiler, other applications involving fluid velocity measurement may include correlation current profilers, velocity logs and so forth.

In FIG. 2, a CPU board 200, power I/O board 202, and digital signal processor (DSP) board 204 are all existing components of the preferred ADCP suite. The CPU board 200 components include a microprocessor 206, preferably a Motorola MC86HC000FN20 and programmable logic device 208 such as the IFX780 available from Altera Corporation. The power I/O board 202 includes an attitude clock generator 210, attitude temperature generator 203 (which generates a signal functionally related to the difference between water temperature and attitude sensing subsystem temperature), a fluxgate sensor sub-assembly 205 (FIGS. 3 and 4), a biaxial tilt sensor 207 (Fredericks p/n 0717-2222-99; see FIG. 5), and other elements of the fluxgate driving and sensing circuits (see FIG. 6 and FIG. 7). The DSP board 204 includes a standard analog multiplexer (MUX) unit 212 and an analog to digital converter 214, both of which are well known to one of ordinary skill in the electronic arts.

Significantly, there is a logical interconnection (i.e., data flow) between elements of the CPU, power and I/O, and DSP boards. The highly integrated approach of the present invention has allowed the overall size and weight of the ADCP package to be substantially reduced while retaining the same performance.

The individual fluxgate sensor elements (two in total) 404 are detailed in FIG. 3. In a preferred embodiment, each element has a toroidal core 300 (such as Magnetics p/n 80656-5F-0012) with a helically wound excitation coil 302 of 200 turns of 32 AWG wire. A second embodiment utilizes 100 turns of 32 AWG wire (Infinectics p/n S625C310-HC2074-C). The former embodiment is preferred in that it reduces the excitation current required to achieve the desired core saturation profile. The toroidal core 300 is then enclosed by two plastic half-shells 304 and two sense coils 306 are wound in an orthogonal orientation around the shells.

FIG. 4 is a detailed drawing of the preferred embodiment of the fluxgate sensor sub-assembly 205 (FIG. 2). The sensor assembly 205 comprises a triangular shaped mounting block 400, electrical terminations 402 and two fluxgate sensor subassemblies 404 that mount on two of the three sides of the block and are rotated 45° in relation to each other. This rotation ensure that a failure of any of the coils will always be observable in the compass output. While only three coils are required to determine the earth's field, a fourth coil, i.e., two sense coils per fluxgate, has been added to (1) provide a redundant measurement so that a coil failure will be detected, and (2) provide a redundant measurement to detect non-uniform fields that induce compass errors, thereby increasing reliability and accuracy over prior art systems using three sense coils.

Figure 5A:
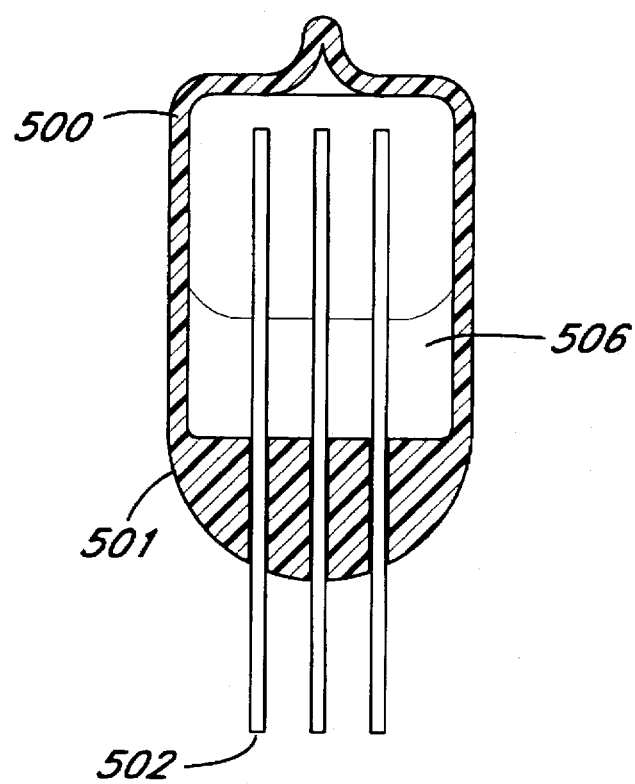
FIGS. 5a–b are detailed drawings of a preferred embodiment of an improved multi-axis tilt sensor used for measuring platform tilt and orientation.
Figure 5B:
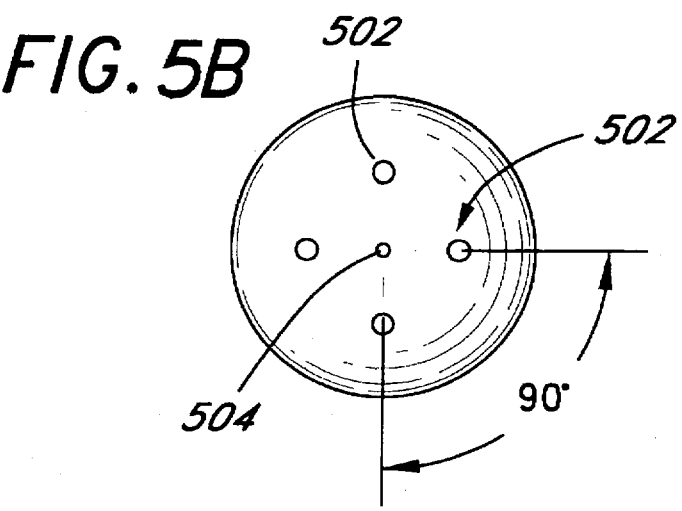

FIG. 5 details a preferred embodiment of the multi-axis tilt sensor 207 (FIG. 2) for use in the ADCP subsystem. A sensor element 500 comprises a sealed chamber 501 with four outer electrodes 502 and one shorter center electrode 504 penetrating the chamber as shown. The outer electrodes 502 are oriented parallel to one another and disposed at 90 degrees with respect to one another around center electrode 504. The outer electrodes 502 provide two-axis (i.e., pitch and roll) tilt information, while the center electrode 504 provides up/down orientation information. An electrolytic fluid 506 is disposed within the chamber 501 and in partial contact with each of the electrodes 502, 504, depending upon chamber orientation. All leads of the tilt sensor 500 are capacitively coupled to avoid applying a destructive DC bias to the sensor.

Figure 6:
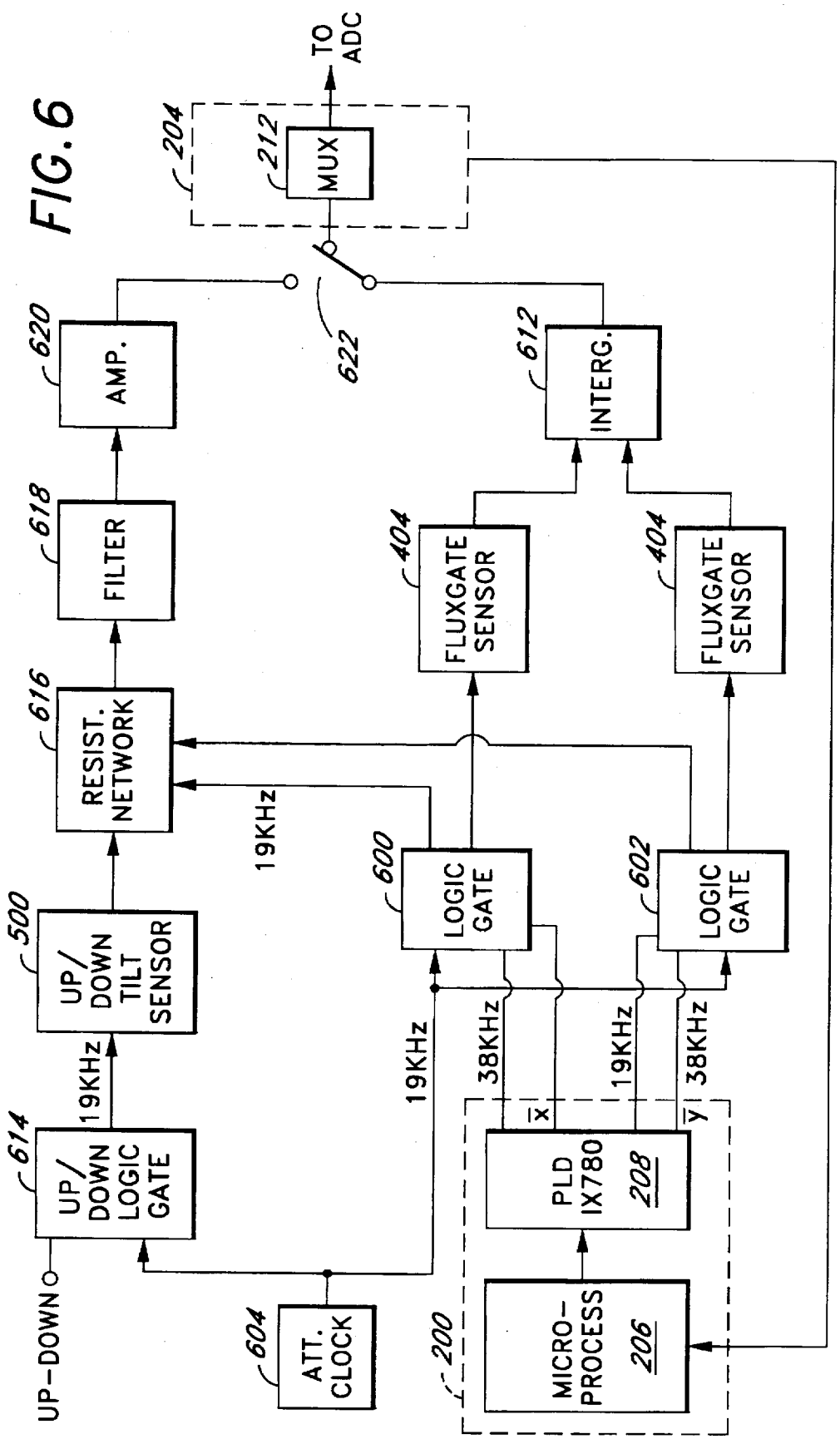
FIG. 6 is a block diagram of a preferred embodiment of fluxgate and tilt sensor drive circuit.

FIG. 6 is a block diagram of a preferred embodiment of the fluxgate and tilt sensor drive circuit. In general terms, the microprocessor 206 mounted on the ADCP system CPU board 200 initiates the programmable logic unit 208 to provide both 19 kHz and 38 kHz signals to each of two fluxgate sensor logic gates 600 and 602. The gates 600 and 602 are comprised of 4 tri-state buffers and receive a phase shifted 19 kHz signal from an attitude clock gate 604 as well as a clock signal from the programmable logic unit 208. Two fluxgate sensor elements 404 are excited by the output signals of the two fluxgate sensor logic gates 600 and 602 to produce a sensing coil output to an integrator 612. The tilt sensor 500 and resistor network 616 receive an excitation signal from the fluxgate logic gates 600 and 602 (for derivation of the tilt signal) or up/down logic gate 614 (for the up/down signal). The output of the resistor network 616 is filtered by a switch capacitive filter 618 and amplified by an amplifier 620. A switch 622 controls the outputs of the amplifier 620 and the integrator 612 to provide an input to the multiplexer unit 212 mounted on the DSP board 204. The digitized signals corresponding to magnetic field vector and vessel attitude are fed from the DSP board 204 to the CPU board 200 for formation of the coordinate system transformation matrix.

Figure 7A:
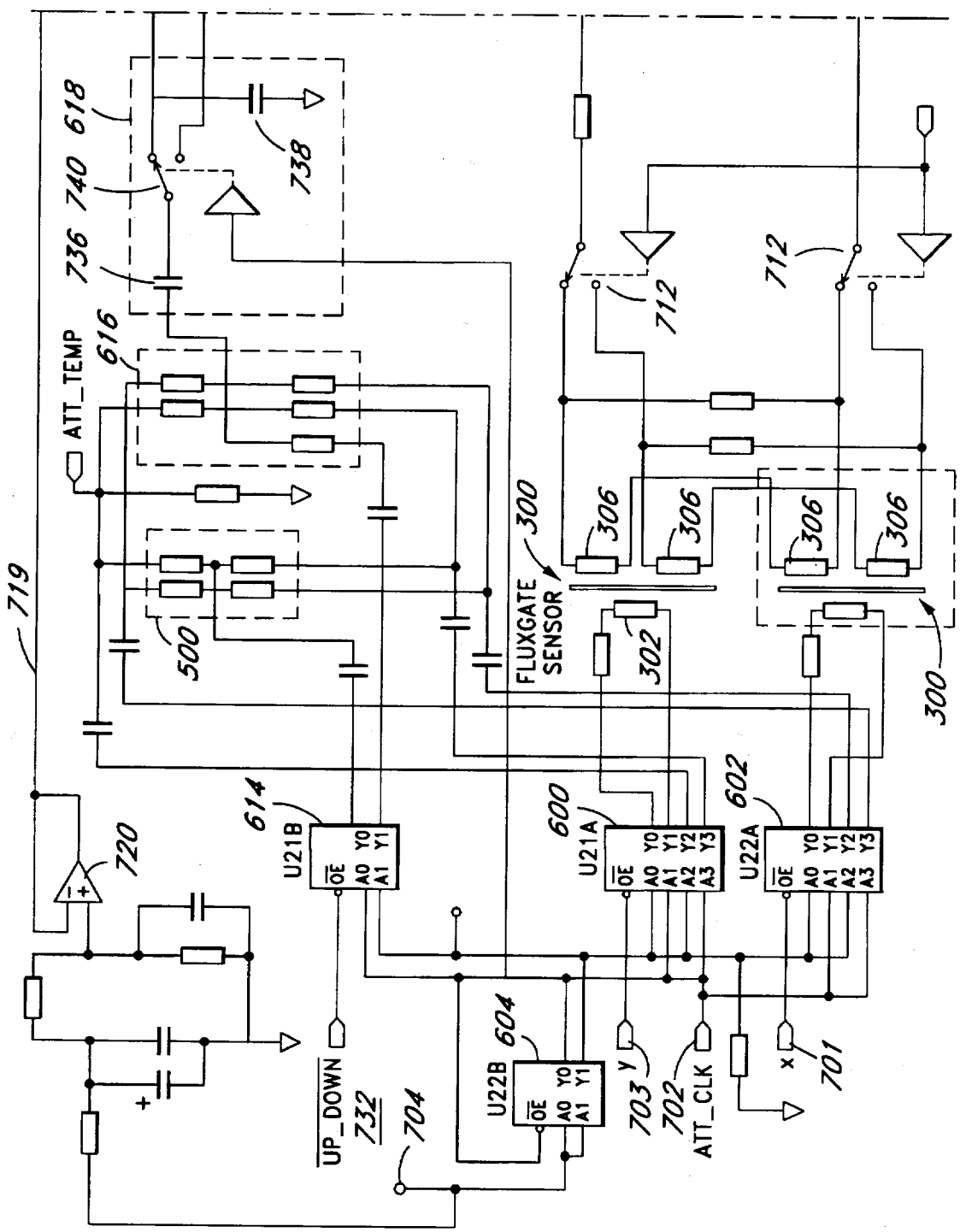
FIG. 7 is a detailed schematic diagram of a preferred embodiment of fluxgate and tilt sensor drive circuit.
Figure 7:
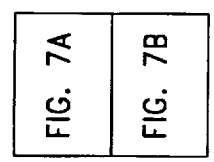
Figure 7B:
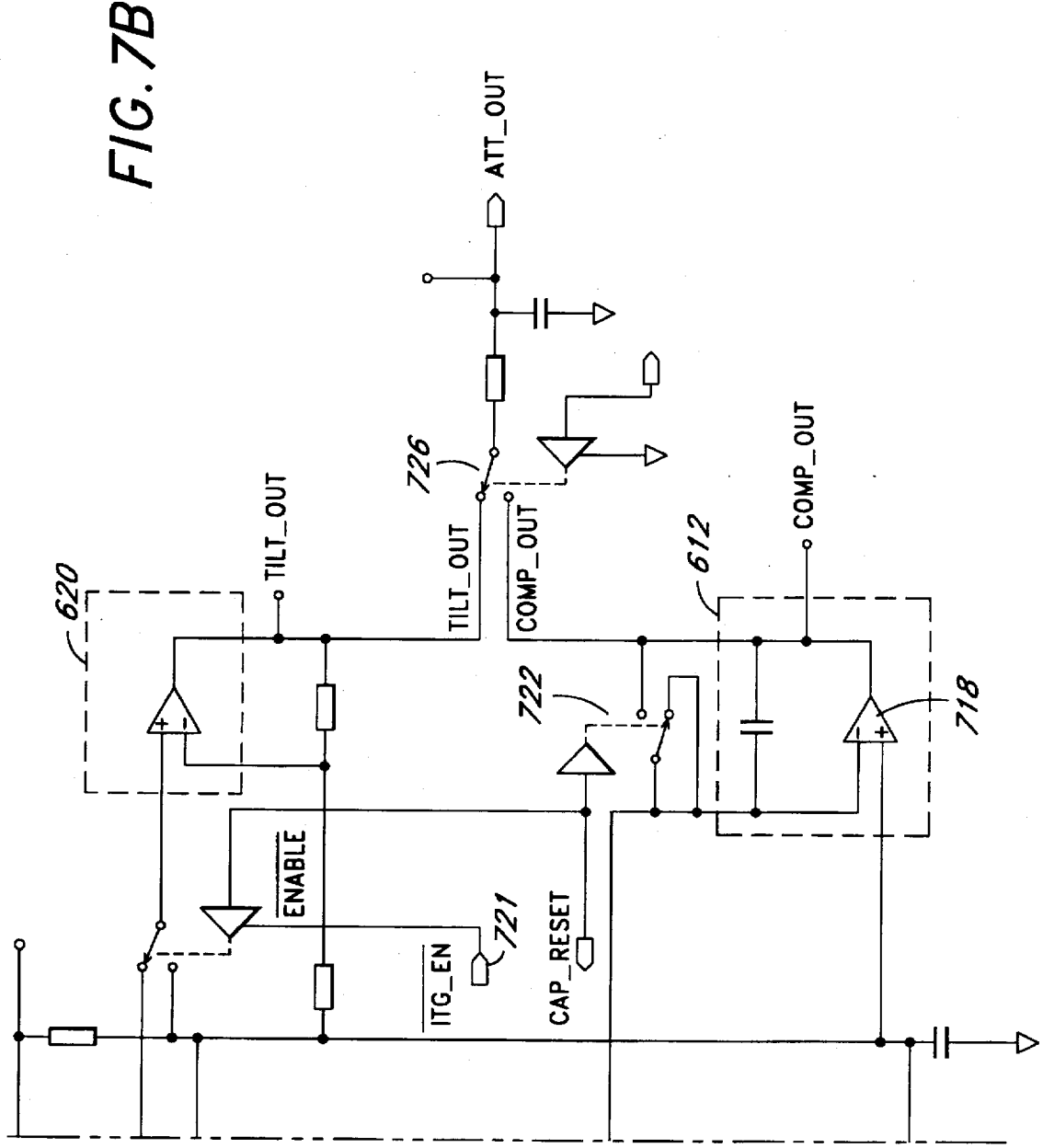
Figure 8A:
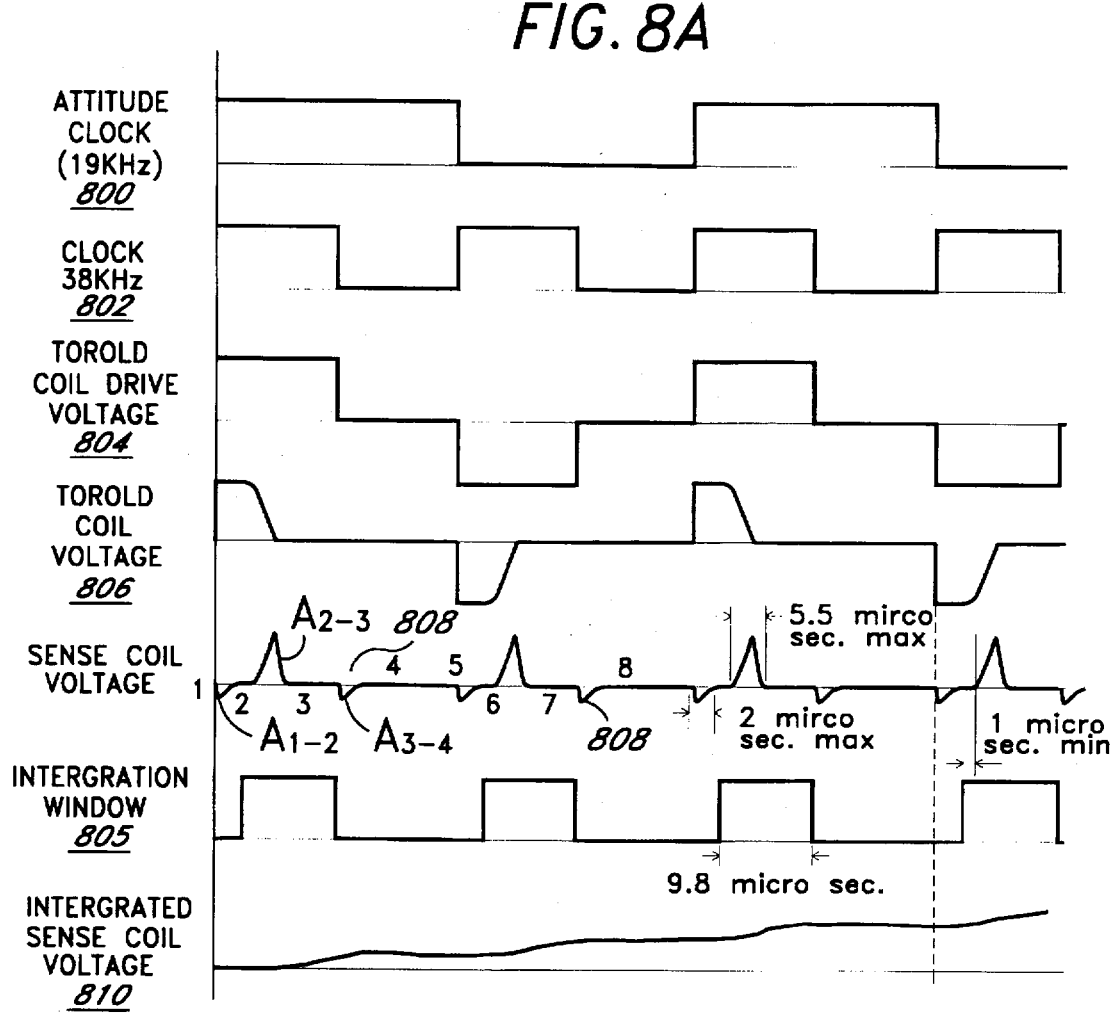
FIG. 8a is a timing diagram showing the relationship of the driving (coil), sensing coil, and integrator circuit output waveforms as a function of time.

FIG. 7 is a detailed schematic diagram of a preferred embodiment of fluxgate and tilt sensor drive and sensing circuit. FIG. 8 is a timing diagram showing the relationship of the driving coil, sensing coil, and integrator circuit output waveforms as a function of time. The control signals referenced in the following discussion of fluxgate and tilt sensor circuit operation originate in microprocessor 206 and are latched in the programmable logic device 208:

X/(X drive signal enable),
Y/(Y drive signal enable),
UP_DOWN/(up/down sense enable),
ITG_EN/(integration enable),
CAP_RESET (capacitive reset),
A_B/(fluxgate sense coil select),
HEAD_TILT/(heading/tilt signal selection).

These signals are sequenced by microprocessor 206 to configure the compass circuit to measure the earth's magnetic field vector and tilt of the ADCP unit 100.

Fluxgate Sensor Circuit

Reference is made to FIGS. 2 and 7 and the timing diagram of FIG. 8 in the following discussion of the operation of the fluxgate sensor circuit hardware. The excitation of the toroidal core drive winding 302 is initiated by the microprocessor 206 via the logic chip 208. Both a fundamental 19 kHz (ATT_CLK or Attitude Clock) squarewave 800 (FIG. 8) and an additional 38 kHz square wave 802 are generated in the logic chip 208. The drive winding excitation signal 804 (FIG. 8) is derived from these two signals plus a 19 kHz squarewave 180° out of phase with the ATT_CLK input 702 that is created from the ATT_CLK 702 and VDD1 704 signals. These signals originate in the main power to the compass at the attitude clock logic gate (U22B) 604 of the Power I/O circuit on the Power I/O board 202. The two 19 kHz signals are gated with either the X/701 or Y/703 38 kHz signals at fluxgate sensor logic gates (U21A) 600 or (U22A) 602.

The toroidal coil's excitation waveform 804 across the input resistors to the fluxgate drive coils, and a waveform showing core saturation 806 are given in FIG. 8.

As the core 300 saturates, the linkage of the earth's flux in the area enclosed by the fluxgate element sensing coils 306 decreases. This causes an induced voltage in the sense coil windings 306 of one of the fluxgate sensors 404 of FIG. 7, depending on which axis is selected. Two switches (U12A and B) 712 connect the desired coil to the Miller integrator circuit 612 composed of a capacitor (C28) 716 and an amplifier (U15A) 718.

Integration from the reference voltage BUF_REF 719 output by another amplifier (U18A) 720 is only allowed to occur during the window of time 805 indicated in FIG. 8 which corresponds to the time the signal ITG_EN/721 is held low in FIG. 7.

The present invention has an excitation waveform 804 that drives the toroidal coil 302 with alternating squarewave current separated by a period of relaxation. Use of this "tri-state" waveform (i.e., having positive, negative, and relaxation states) is distinguished from U.S. Pat. No. 4,677,381, for example, which discloses use of a bi-state excitation signal comprising alternating periods of positive and zero voltage. The use of the tri-state signal allows for increased data rate in that twice as many primary coil current transition events occur per given time period for the same frequency of signal, and obviates the need for traditional transistor logic needed to create current reversal through the winding. Furthermore, use of a relaxation state in the waveform allows the most desirable section of the sense coil output to be captured by the integrating "windows" 805 created when two switches (U12A and B) 712 are alternately selected to provide input to the integrator 612.

Figure 8B:
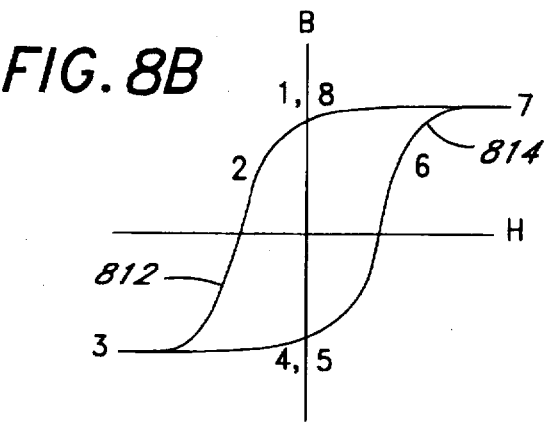

As shown on the hysteresis diagram of FIG. 8b, the change in the magnetic flux density B approaches zero during the periods 2–3 812 and 6–7 814 corresponding to complete saturation of the ferromagnetic core element 300 (FIG. 3a) of either fluxgate element 404. As the magnetic field intensity H is reduced the remanent magnetization of the core sustains a nonzero flux density until the field intensity is sufficient to reorient the dipoles in the core. Accordingly, sections 3–4 and 7–8 808 correspond to periods of low inductance and subsequent fast unsaturation of the toroidal core which produce non-linearities and higher order harmonics (ringing). Through use of the relaxation period in the excitation waveform and the integration window, the section of the saturation waveform corresponding to the periods 3–4 and 7–8 808 is intentionally not included in the integration, thereby effectively eliminating the higher order harmonics and non-linearities.

In FIG. 7, a switch (U16A) 722 controlled by the 19 kHz attitude clock signal 702 is used to reset the capacitor (C28) 716 of the integrator circuit following measurement of each component of the earth's magnetic field. Another switch (U16C) 726 controlled by the microprocessor 206 via the IFX780 programmable logic device 208 connects either the fluxgate output 810 or the tilt sensor output to a multiplexer 212 and analog-to-digital converter (ADC) 214 as indicated by FIG. 2. The input voltage range of the ADC 214 is 4 V in the preferred ADCP application; BUF_REF is set to 2 V (corresponding to zero field strength) so that for the circuit component values shown and an integration time of 1 ms, the allowable flux density is approximately 0.9 Gauss.

Tilt Sensor Circuit

The electrolytic tilt sensor of FIG. 5 has a total of five leads: four arranged in a diamond pattern 502 and a fifth 504 at the center of this pattern. The center (fifth) lead is shortened with respect to the rest. Since the fifth lead is only immersed in electrolyte 506 in one orientation of the tilt sensor, this lead may be used to sense up/down orientation thereby providing an improvement over existing systems. The other four leads provide two-axis tilt information. To determine up/down orientation, the outer four pins 502 of tilt sensor element 500 are driven in pairs through the resistor network 616 of FIGS. 6 and 7. If the electrolytic fluid touches the center electrode of the tilt sensor, the circuit output will be forced to near zero volts, otherwise it will be forced over 4 V.

Referring to FIG. 7, for tilt axis X and Y, the tilt sensor 500 is driven with a 19 kHz squarewave generated at the fluxgate sensor logic gates (U22A and U21A) 600 and 602, respectively. During the time sensor tilt is determined, the UP_DOWN/input 732 is held high so that the up/down logic gate (U21B) 614 does not drive the tilt sensor. The output of the tilt sensor circuit is a square wave with amplitude proportional to the degree of sensor (platform) tilt. The present invention results in improved performance since the effects of changing electrolyte conductivity with temperature are effectively cancelled by driving pairs of sensor electrodes as opposed to individual sensors electrodes as in the prior art. Specifically, changes in conductivity will affect the impedance of the paired electrodes equally such that the voltage divide function or ratio of the impedances is preserved with changing electrolyte temperature. The sensor output is detected by resistor network 616 and applied to a switch capacitance filter 618 composed of two capacitors (C56) 736, (C57) 738 and a switch (U16B) 740. This signal is then amplified by a non-inverting amplifier (U15B) 620 and is switched by a switch (U16C) 726 as described above. In a manner similar to the fluxgate circuit operation, positive or negative deviation from the approximate null tilt output voltage of 2 V corresponds to positive or negative tilt.

Heading Calculation

The compass calculation begins at the CPU board 200 of FIG. 2 with calculation of the earth's magnetic field vector. A novel soft and hard iron perturbation effects model is used to calculate the earth's field vector. Calculation of the magnetic field vector is accomplished using the following equations and relationships:

| | |
|---|---|
| $X = SM^T B + O$ | instrument response to local field |
| $\tilde{B} = (I + MTM^T)B + MP$ | model for deviation effects |
| $X = [S(I + T)] M^T B + [O + SP]$ | combined model |
| $\hat{B}^i = [(S^T S)^{-1} S^T](X - O)$ | least-squares fit, $P = O$, $T = O$ |
| $\quad = [\hat{B}_S \; \hat{B}_F \; \hat{B}_M]^T = M^T \hat{B}^g$ | |
| $\hat{B}^g = M\hat{B}^i = [O \; \hat{B}_N \; \hat{B}_U]^T$ | |
| $M = rot(-H, 3) rot(P, 1) rot(R, 2)$ | in terms of elementary rotations |
| $M^T = rot(-R, 2) rot(-P, 1) rot(H, 3)$ | |
| $dip = -\arcsin(\hat{B}_U/|\hat{B}|)$ | (positive in Northern Hemisphere) | where:

B=ambient magnetic field vector (components in geographic frame)

$\tilde{B}$=local magnetic field vector including deviation disturbances attached to the instrument (components in geographic frame)

$\hat{B}^g$=measured estimate of B (components in geographic frame)

$\hat{B}^i$=measured estimate of B (components in instrument frame)

M=rotation matrix from instrument to geographic coordinates $M^T$=rotation matrix from geographic to instrument coordinates X=column vector of 4 magnetometer sensor readings S=magnetometer sensitivity matrix (4×3)

O=column vector of 4 magnetometer offsets

P=permanent-field component of vector deviation (3×1, in instrument frame)

T=tensor representing the induced-field component of deviation (3×3, in instrument frame)

I=identity matrix

Figure 9:
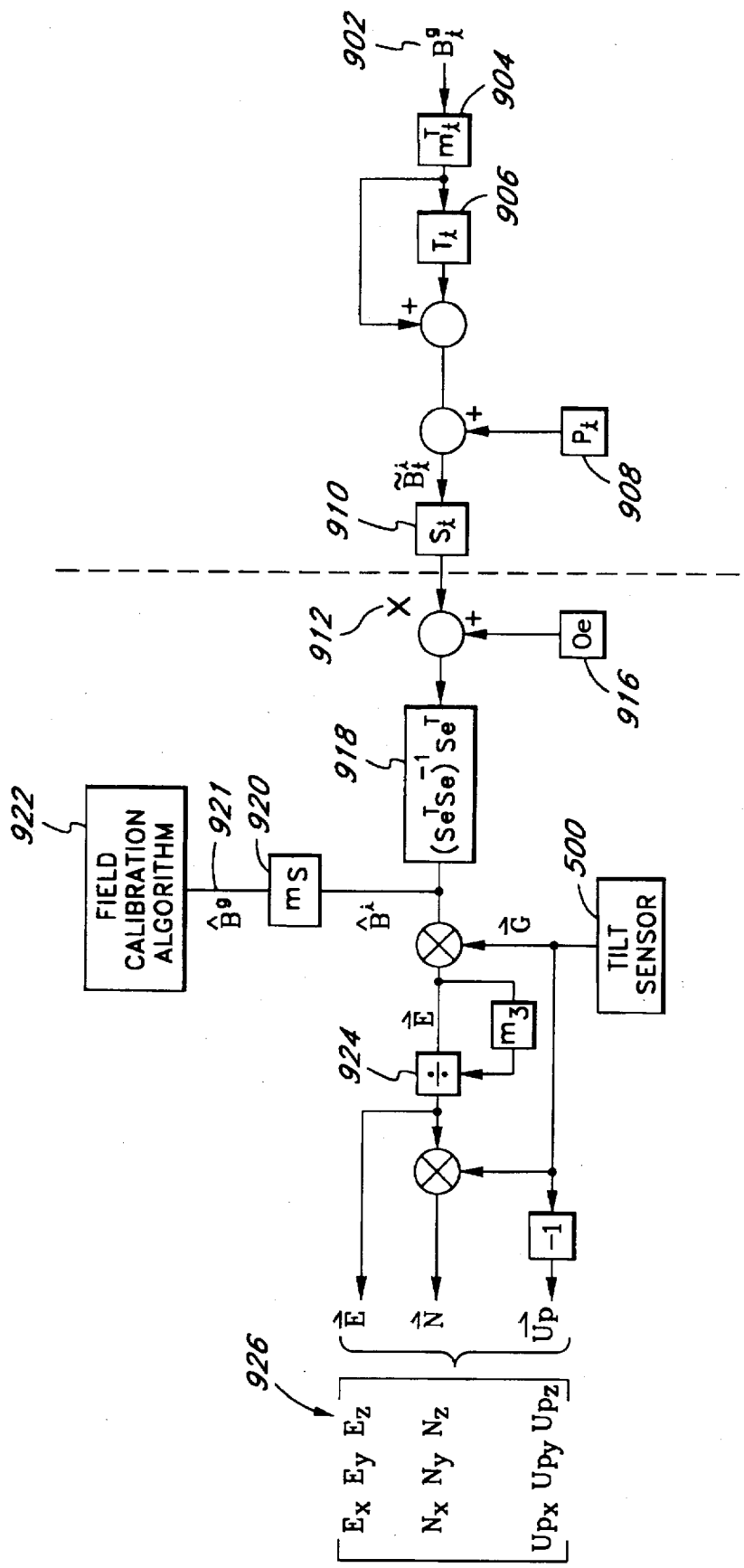
FIG. 9 is a flowchart of the soft and hard iron perturbation model methodology used for calculating the earth's magnetic field vector and heading.

Reference is made to the logical flow chart of FIG. 9 in the following discussion of the perturbation model. The model begins with the true gravitational vector 902 in the geographic coordinate system which is transformed into the instrument (ADCP) coordinate system by way of a rotational matrix M, 904. 3×3 Tensor T, 906 is applied to account for induced permeability effects including cross-coupling and amplification of the local magnetic field resulting from compass supporting hardware. Subsequently, an offset matrix P, 908 is applied to the resulting vector to account for the permanent magnetic field resulting from remanence in any ferromagnetic material in vicinity to the instrument (hard iron effect). A true sensitivity correction S, 910 is then applied to account for the electrical response of the sense coils 306, including the effects of their orientation, and for that of supporting circuitry. This produces a column vector X 912 in 4-dimensional sense coil space, which also represents the conceptual boundary between the physical/ hardware and firmware domains of the system 914. A column vector representing the estimated electrical offsets of the sense coils $O_e$ 916 is next applied. Finally, an estimated sensitivity correction matrix $S_e$ 918 is applied, the resulting output being an estimate of the earth's field in the instrument coordinate system plus and estimated error value. Additionally, another matrix $M_r$ 920 is applied to derive the estimated magnetic field vector in the geographic frame 921 for use by the field calibration algorithm 922.

After the earth's magnetic field vector is estimated, this information is used to calculate heading in the following manner. The output of the tilt sensor 500 of FIGS. 5 and 7 is approximately linear for the tangent of the ADCP's angle of tilt; hence, a linear rotation to correct for tilt sensor element misalignment with the ADCP pitch (Y) and roll (X) axes is first applied to the raw tilt sensor data. Then, the arctangent function is applied to find the pitch and roll from this data. The gravitational vector G for the upward direction is then found from the equation:

$$G=(\tan(Roll)x'+\tan(Pitch)y'-z')/(\tan^2(Roll)+\tan^2(Pitch)+1)^{1/2},$$

and for the downward looking direction, $$G=(-\tan(Roll)x'+\tan(Pitch)y'-z')/(\tan^2(Roll)+\tan^2(Pitch)+1)^{1/2},$$

where x', y' and z' are unit vectors aligned with the ADCP coordinate system.

Figure 10A:
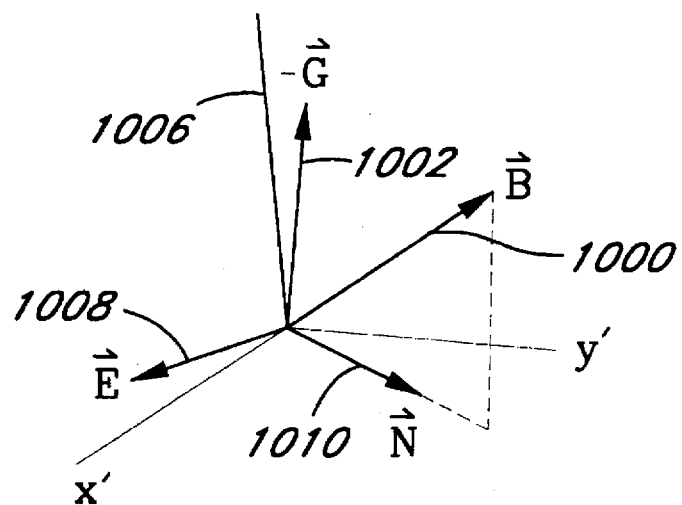
FIGS. 10a–b are graphical representations of the relationship between the gravitational, North, and East vectors in the ADCP coordinate systems used in calculating heading.
Figure 10B:
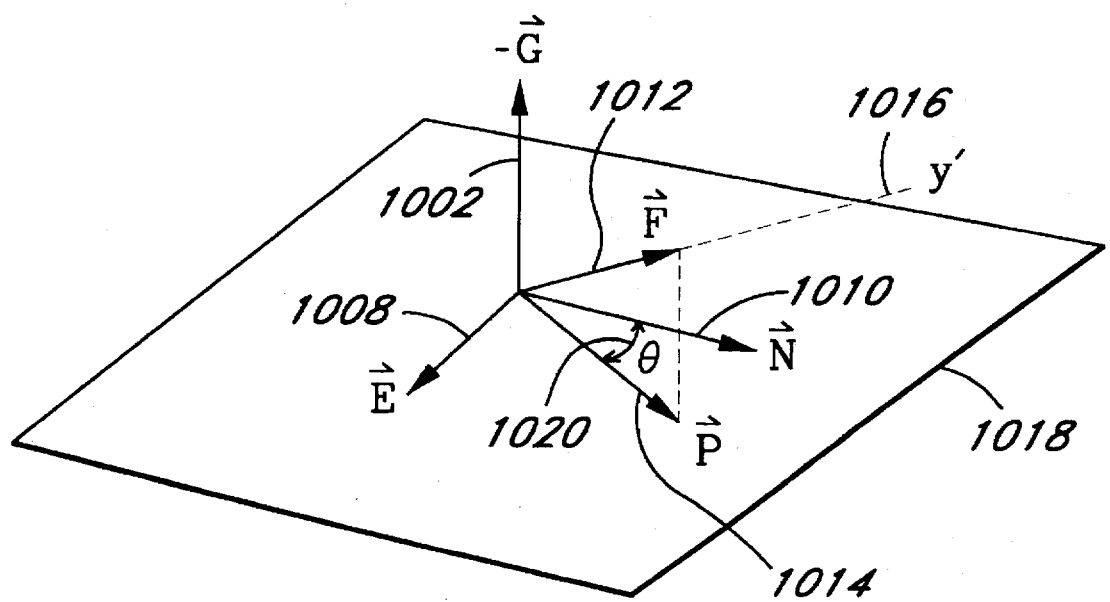

Referring to FIG. 10, the calculation of heading requires the manipulation of the magnetic vector, B 1000, with the gravitational vector, G 1002 to eliminate the vertical component of the magnetic field. G is a unit vector. Both these vectors are in the ADCP coordinate system 1006. A vector pointing east 1008 can be calculated from G×B (the vector cross product of G and B). Therefore, $$E=G\times B/(|G\times B|)$$

and a vector pointing north 1010 can be calculated from E×G, or $$N=E\times G.$$

The denominator in the E vector 924 is to convert the cross product to a unit vector. Since E and G are unit vectors and perpendicular to one another, N will be an unit vector without normalization.

To calculate heading, two more vectors are created: F 1012 and P 1014. F is an unit vector pointing to the system forward (y') direction 1016 and P is the projection of F in the earth's horizontal 1018:

$$P=F-G(G*F)$$

where * is used to denote the vector dot product operation. Heading 1020 is then defined by the following equation:

$$Heading=Arctan(E*P/N*P)$$

and since $$E*P=E*F-E*G(G*F)=E*F \text{ and}$$

$$N*P=N*F-N*G(G*F)=N*F \text{ then}$$

$$Heading=Arctan(E*F/N*F).$$

The last equation simply states that only the ratio of the two forward components of East and North, respectively are needed to calculate Heading.

Note that N, E and −G form a set of mutually perpendicular vectors. When they are combined to form a matrix and inverted, they form the transformation matrix 926 that is needed to convert velocities, in the ADCP coordinate system, to velocities in the earth's coordinate system. Thus, there is a computational savings in not having to calculate heading and create the transformation matrix from heading, pitch and roll as is traditional in the prior art. The mathematics of vector transformation between two coordinate systems is well understood.

Calibration

The fluxgate and tilt calibrations allow for production variations such as arbitrary winding of the fluxgate coils, positioning of the fluxgate assembly or tilt sensor, and part to part variations of electronic ICs, toroidal cores and tilt sensors. Two types of calibration are described herein; specifically, factory calibration and field calibration. In general, the factory calibration is used to generate estimated values of the offset and sensitivity matrices $O_e$ 916 and $S_e$ 918, respectively. The field calibration procedure and algorithm then utilizes the estimated offset and sensitivity to calculate the permeability tensor $T_r$ 906 and the hard iron matrix $P_r$ 908 and ultimately generate revised O and S corrections.

Factory Fluxgate Calibration

Calibration of the fluxgate output determines the relative sensitivity of each of the four fluxgate coils in addition to the offset of each coil. This is accomplished by orienting the unit in eight positions orthogonal to each other. It is important to note that using this method, no absolute reference to the earth's field must be established to calibrate the compass unlike the prior art. Quality indices are calculated from the extra data taken during the calibration. This calibration method also precludes the need for precise alignment during manufacturing of the fluxgate sensors.

S and O (the magnetometer sensitivity and offset matrices, respectively) are measured in the factory calibration. Any internal magnetic deviation effects present at the time of calibration will be included in S and O (that is, [S(I+T)] will be called S and [O+SP] will be called O.) An N-position factory calibration will give a set of N sensor output vectors $X_k$ corresponding to N orientations $M_k$:

$$X_k=SM_kB+O,$$

k=1, 2, . . . N

Assume that the $M_k$ matrices express rotations from the instrument frame to an arbitrary fixed frame, not necessarily the geographic frame, since we do not want to rely on external references (either heading or level) for this calibration. Therefore we can treat the $M_k$ as known matrices and the components of B as three unknown constants. With 4 fluxgate sensor elements there are a total of 4N measurements. The unknowns are:

S—12
O—4
B—3
total—19

Because the equation to be solved is non-linear, there is a scale factor common to all elements of the sensitivity matrix S that cannot be determined, leaving 18 unknowns that can. The scale factor is not needed to determine heading with the compass. To use the compass as a magnetometer, we can impose an additional constraint that the magnitude of B is known at the location where the calibration is performed.

In any case, a minimum of 5 orientations is required to get more measurements than unknowns, but as seen below the calculations become easier as more are added. If orientations are limited to the ways a cube can fit into a corner, there are 24 possibilities to choose from (6 faces×4 rotations about each face).

Suppose we restrict the orientations to those of a cube-in-a-corner, so that the 24 possible $M_k$ have ±1 and two zeros in some order in every row and column (half of the possible $3! \times 2^3 = 48$ matrices are eliminated by the constraint |M|=+1). Call the three components of B a, b, and c such that:

$$B = [a b c]^T$$

Then $M^T_k B$ will be a vector with components (±a, ±b, ±c) in some order, where with every permutation (swap of two terms) from the original order (a, b, c) there is a sign change in exactly one of the swapped terms.

Eight-position Method

The calculations are very simple if we use three extra orientations beyond the minimum of five. This method involves moving the z axis of the instrument in a plane by two 90° steps and rotating the instrument several times about each of these three z axis orientations. The offset vector O is determined from the average of measurements from four orientations mutually 180° apart. Each column of the sensitivity matrix S is determined from the average of two measurements 180° apart about the corresponding instrument axis when that axis is roughly aligned with the largest component of the earth's magnetic field B. (The z axis is aligned in this direction half-way through the calibration).

One could tilt the plane to which the z axis is confined during the calibration so that B lies in it, but it is probably easier to use a vertical or level plane. For best accuracy, we need two procedures, one for large dips (temperate latitudes) that uses the vertical component of B and a different one for small dips (tropical latitudes) that uses the horizontal component of B. Since the dip is roughly twice the north latitude, the tropical procedure is preferred for latitudes below about 22°.

Examples of eight-position sequences are given below for both types of procedure. Of course, the order of the sequence and certain choices of position are somewhat arbitrary. Another pair of procedures for calibrating a compass mounted in an ADCP with an elbow may be used so that only three changes in the orientation of the y axis (electronics chassis axis) are necessary.

Temperate latitude procedure: (|dip|>45°, a≈−$B_U$, b≈$B_N$, c≈0)

| k | $M_k^T B$ | Rotation |
|---|---|---|
| 1 | [ a  b  c]$^T$ | start (x ≈ −U, y ≈ N, z ≈ E) |
| 2 | [ b −a  c]$^T$ | 90° Counter-clockwise (CC) about z ≈ E |
| 3 | [−a −b  c]$^T$ | 90° CC about z ≈ E |
| 4 | [−c −b −a]$^T$ | 90° CC about y ≈ −N (beam 3) |
| 5 | [ c  b −a]$^T$ | 180° about z ≈ U |
| 6 | [−a  b −c]$^T$ | −90° CC about y ≈ N |
| 7 | [−b −a −c]$^T$ | −90° CC about z ≈ −E |
| 8 | [ a −b −c]$^T$ | −90° CC about z ≈ −E |

Tropical latitude procedure: (|dip|<45°, a≈−$B_N$, b≈−$B_U$, c≈0)

| k | $M_k^T B$ | Rotation |
|---|---|---|
| 1 | [ a  b  c]$^T$ | start (x ≈ −N, y ≈ −U, z ≈ E) |
| 2 | [ b −a  c]$^T$ | 90° CC about z ≈ E |
| 3 | [−a −b  c]$^T$ | 90° CC about z ≈ E |
| 4 | [−c −b −a]$^T$ | 90° CC about y ≈ U (beam 3) |
| 5 | [ c  b −a]$^T$ | 180° about z ≈ N |
| 6 | [−a  b −c]$^T$ | −90° CC about y ≈ U |
| 7 | [−b −a −c]$^T$ | −90° CC about z ≈ −E |
| 8 | [ a −b −c]$^T$ | −90° CC about z ≈ −E |

$$\delta = (X_1 + X_3 + X_6 + X_8)/4$$

$$a S_x = \tfrac{1}{2}(X_1 + X_8) - \delta$$

$$a S_y = \tfrac{1}{2}(X_2 + X_7) - \delta$$

$$a S_z = \tfrac{1}{2}(X_4 + X_5) - \delta$$

where $S_x$ is the first column of S, $S_y$ is the second column, and $S_z$ is the third column. The rotation sequence and the algorithm are the same for both procedures and |a|>|b|>>|c|; only the initial orientations are different. However, note that component a is only a positive number for the temperate-latitude procedure in the northern hemisphere; otherwise it is negative and a sign change is needed for every element of S.

Six-position Method

This method uses only two orientation of the z axis instead of three, making it somewhat easier to perform. It's primary apparent disadvantage is that the offset vector O cannot be readily determined, making its accurate measurement more dependent upon sensor linearity.

The sequence of positions is similar to the first 5 positions of the eight-position method, with an extra position inserted at 90° between the last two.

Temperature latitude procedure: (|dip|>45°, a≈−$B_U$, b≈$B_N$, c≈0)

| k | $M_k^T B$ | Rotation |
|---|---|---|
| 1 | [ a  b  c]$^T$ | start (x ≈ −U, y ≈ N, z ≈ E) |
| 2 | [ b −a  c]$^T$ | 90° CC about z ≈ E |
| 3 | [−a −b  c]$^T$ | 90° CC about z ≈ E |
| 4 | [−c −b −a]$^T$ | 90° CC about y ≈ −N (beam 3) |
| 5 | [−b  c −a]$^T$ | 90° CC about z ≈ U |
| 6 | [ c  b −a]$^T$ | 90° CC about z ≈ U |

Tropical latitude procedure: (|dip|<45°, a≈−$B_N$, b≈−$B_U$, c≈0)

| k | $M_k^T B$ | Rotation |
|---|---|---|
| 1 | [ a  b  c]$^T$ | start (x ≈ −N, y ≈ −U, z ≈ E) |
| 2 | [ b −a  c]$^T$ | 90° CC about z ≈ E |
| 3 | [−a −b  c]$^T$ | 90° CC about z ≈ E |
| 4 | [−c −b −a]$^T$ | 90° CC about y ≈ U (beam 3) |
| 5 | [−b  c −a]$^T$ | 90° CC about z ≈ N |
| 6 | [ c  b −a]$^T$ | 90° CC about z ≈ N |

$$A_1 = (a-c)S_x = \tfrac{1}{2}(X_1 - X_3 + X_4 - X_6)$$

$$A_2 = (a-c)S_y = \tfrac{1}{2}(X_1 - 2X_2 + X_3 + X_4 - 2X_5 + X_6)$$

$$A_3 = (a-c)S_z = \tfrac{1}{2}(X_1 + X_3 - X_4 - X_6)$$

$$[c/(a-c)]A_1 + [b/(a-c)]A_2 = A_4 = \tfrac{1}{2}(X_6 - X_4)$$

$[b/(a-c)]A_1-[c/(a-c)]A_2=A_5-\frac{1}{2}(X_4-2X_5+X_6)$

Solving this set of overconstrained linear equations:

$[b/(a-c)] \approx (A_2 \cdot A_4 + A_1 \cdot A_5)/(|A_1|^2+|A_2|^2)$ $[c/(a-c)] \approx (A_1 \cdot A_4 + A_2 \cdot A_5)/(|A_1|^2+|A_2|^2)$ $[a/(a-c)] = 1+[c/(a-c)]$ $[(a+c)/(a-c)] = 1+2[c/(a-c)]$ $(a-c)\bar{s}_2 \approx A_3/(1+2[c/(a-c)])$ $\delta = \frac{1}{4}(X_1+X_3+X_4+X_6)+A_3/(2+4[c/(a-c)])$ Again, the rotation sequence and the algorithm ar the same for both procedures and $|a|>|b|>>|c|$; only the initial orientations are different. However, note that (a–c) might be negative, so that a sign change is needed for every element of S.

Error Component

The redundancy inherent in having four sensors instead of three can be expressed by adding a fourth column to S representing the input from a fictitious error source. This fourth column, $S_e$, must be orthogonal to the other three columns of S, even though they aren't necessarily orthogonal to each other. One method of finding a vector proportional to $S_e$, is to use the transpose of the last row of the inverse of S, after S has been augmented by an arbitrary vector in the fourth column, for example a matrix composed of all ones $a(S_e)^T=[0001][S_x S_y S_z [1111]^T]^{-1}$ where a is an arbitrary scale factor. This method produces a valid result because every column of a matrix is orthogonal to every row of the inverse except the one with the same index.

Augmenting the sensitivity matrix S with the fourth column $S_e$ makes S a non-singular matrix, and its inverse $S^{-1}$ matches the generalized inverse $[(S^T S)^{-1} S^T]$ given in the "Equations" section above, augmented by an extra row $(S_e)^T/|S_e|^2$ for the error component. This last row is analogous to the equation for the Doppler error velocity in the beam-to-instrument rotation algorithm.

Field Calibration

Typically, ADCPs are deployed with fixed flotation or other mounting equipment that can have some remnant magnetic field. Also, the batteries used to power the system have a strong permanent magnetic field. A full factory calibration of the fluxgate sensor to remove errors induced by changes in this magnetic material requires an accurate fixture. To avoid performing the full factory calibration, an improved field calibration algorithm was developed that only requires the unit to be rotated 360° in two separate planes. This field calibration algorithm is detailed below.

The field calibration algorithm is based on an error estimating algorithm that examines fluctuations in the calculated earth's magnetic field to accurately predict the single and double cycle compass error in addition to the root-mean-square value of the high order compass errors and random compass errors. Note that both the field calibration and error estimating algorithm are built into the firmware for ease of use and require virtually no fixturing and no absolute heading references.

Derivation of the Field Calibration Algorithm for Hard Iron

A new offset vector O can be found by letting $P=Si*V$ where V is the effect on the coils due to the permanent field of the hard iron. Then $Bg=M*(Si*(X-O+V))$ and the new equation used in the compass firmware calculations to determine the earth's field is $Bi=Si*(X-Onew)$ where $Onew=O-V$ The existing error estimating algorithm in the firmware determines the DC, single and double cycle terms of the Fourier series of the earth's horizontal field component. This can be expressed by the following:

$Bg=a0+a1*CH+b1*SH+a2*C2H+b2*S2H$  (2)

where S and C stand for sine and cosine functions and H stands for heading.

The single cycle terms a1 and b1 will be used in this field calibration to find P and ultimately Onew.

Since we are interested only in the horizontal component of the earth's field, only the second row of M will be examined. This can be expressed as $M(2,:)=[(-SH*CR+CH*SP*SR) CH*CP (-SH*SR-CH*SP*CR)]$ where P and R stand for pitch and roll, respectively.

By examining the first equation for Bg, (1) above, one can see that the variation of the horizontal component vs. heading will be due to P. P can be found by setting the sine and cosine terms of equation (1) and (2) equal to each other and rearranging.

For the first rotation of the field calibration then,

| [(SP * SR) | CP | (–SP * CR)] | [P1] |   | [a1] |
| [–CR       | 0  | –SR       ] | [P2] | = | [b1] |
|            |    |             | [P3] |   |      | which can be expressed as $Ta*P=Ca.$

Since there are three unknowns and only two equations, a second rotation is required. Similar equations can be written for the second rotation:

$Tb*P=Cb.$

The two rotations can be combined to form $T*P=C.$ where $$T = \begin{bmatrix} Ta \\ Tb \end{bmatrix} C = \begin{bmatrix} Ca \\ Cb \end{bmatrix} \text{ (a 2 element vector)}$$

P is found by solving the least squares equation to yield:

$$P = (T^*T)i^*T^*C$$

where "i" represents matrix inversion and ' matrix transpose. This equation will have a solution if the two rotations are not about the same axis. In practice, the difference in tilt should be at the extreme of the range of accurate tilts (20 degrees maximum) and 10 degrees as a minimum. 20 degrees is slightly out of the specified range but the sensor is still acceptably accurate and will be used since the beam face is a convenient level surface to rotate the unit on.

Likewise, V is found by solving the least squares equation, $$V = (Si'^*Si)^*Si'^*P$$

Tilt Sensor Calibration

There are twelve points in the tilt sensor calibration—six upward looking and six down. For each orientation there are two positions to determine the null point and two for each axis.

SUMMARY

The disclosed invention provides an electronic heading and attitude sensing subsystem which is fully integrated with the existing hardware of an acoustic Doppler current profiler (ADCP) oceanographic sonar suite. The subsystem uses a tri-state drive signal with relaxation periods and integration windows to synchronously drive the fluxgate magnetic sensors while reducing the effects of non-linearities and higher order harmonics which may result in heading errors. The present invention further includes an electrolytic tilt sensor device and driving circuit which allow measurement of system vertical orientation without the effects of electrolyte conductivity. Additionally, the present invention includes methods of system factory and field calibration without external magnetic field reference or fixturing, soft and hard iron magnetic perturbation modeling, and heading calculation with reduced complexity.

While the invention has been described and illustrated in detail in the foregoing matter, various changes, substitutions and modifications may be recognizable to those skilled in the art without departing from the spirit of the invention. The appending claims are therefore intended to cover any such changes and modifications as fall within the scope of the disclosed invention.

What is claimed is:

1. A fluxgate sensor drive and sensing circuit, comprising:
   a plurality of fluxgate sensors, each having a core, an excitation coil, and one or more sensing coils;
   a drive circuit providing an excitation signal to said excitation coil, said signal having alternating changes in polarity, said changes in polarity being separated by a relaxation period of no excitation current; and
   an integrator integrating the output of said sensing coils.

2. The fluxgate sensor circuit of claim 1, wherein said fluxgate sensors include four sensing coils.

3. The fluxgate sensor circuit of claim 1, wherein said drive circuit comprises a microprocessor, a programmable logic chip, and a plurality of logic gates.

4. The fluxgate sensor circuit of claim 1, wherein said integrator includes a means for allowing said integration to occur only during selected periods, said periods being synchronized with said changes in polarity of said excitation signal.

5. The fluxgate sensor circuit of claim 1, wherein said integrator comprises a Miller integrating circuit having an operational amplifier with feedback capacitor.

6. A method of measuring the orientation of a device disposed in a magnetic field, comprising the steps of:
   providing a plurality of fluxgate sensors, each of said sensors having an excitation coil and one or more sensing coils;
   providing an excitation signal having alternating changes in polarity to said excitation coils, each of said changes in polarity being separated by a relaxation period of no excitation current;
   measuring the output signal of said sensing coils;
   integrating said output signals measured from said second coils during selected time periods, said time periods being functionally related to said relaxation periods; and
   measuring the orientation of said fluxgate sensor based on said integrated signals.

* * * * *